United States Patent

[11] 3,590,143

[72] Inventors Sho Narita; Masanori Ogino, both of Yokohama, Japan
[21] Appl. No. 720,049
[22] Filed Apr. 10, 1968
[45] Patented June 29, 1971
[73] Assignee Hitachi, Ltd. Tokyo, Japan
[32] Priority Apr. 12, 1967, Apr. 12, 1967
[33] Japan
[31] 42/22903 and 42/22904

[54] SOUND SIGNAL AMPLIFIER FOR COLOR TELEVISION RECEIVER
1 Claim, 5 Drawing Figs.

[52] U.S. Cl. .......... 178/5.4 AC, 178/5.8
[51] Int. Cl. .......... H04n 9/16
[50] Field of Search .......... 178/5.4, 5.4 AC; 175/5.8, 5.6

[56] References Cited

UNITED STATES PATENTS

| | | | |
|---|---|---|---|
| 2,770,673 | 11/1956 | Creamer, Jr. | 178/5.4 |
| 2,896,015 | 7/1959 | Smith | 178/5.4 A |
| 3,105,109 | 9/1963 | Macovski | 178/5.4 AC |

*Primary Examiner*—Robert L. Griffin
*Assistant Examiner*—Donald E. Stout
*Attorney*—Craig, Antonelli, Stewart & Hill

ABSTRACT: A sound signal amplifier circuit for a color television receiver, including a carrier chrominance signal amplifier and sound intermediate frequency signal amplifier for respectively amplifying a carrier chrominance signal and a sound intermediate frequency signal which are obtained by separating and detecting the output of a tuner for converting a high frequency television signal to an intermediate frequency signal, wherein said sound intermediate frequency signal is commonly amplified in said carrier chrominance signal amplifier, and its level is controlled in accordance with that of the carrier chrominance signal.

INVENTORS
SHO NARITA & MASANORI OGINO

BY Craig & Antonelli

ATTORNEYS

INVENTORS
SHO NARITA + MASANORI OGINO

BY Craig & Antonelli

ATTORNEYS

INVENTORS
SHO NARITA + MASANORI OGINO

BY Craig & Antonelli
ATTORNEYS

INVENTORS
SHO NARITA & MASANORI OGINO

BY Craig & Antonelli
ATTORNEYS

SOUND SIGNAL AMPLIFIER FOR COLOR TELEVISION RECEIVER

BACKGROUND OF THE INVENTION

1. Field of the Invention

This invention relates to signal-processing circuit for a color television receiver, and more particularly it pertains to such signal-processing circuit adapted for commonly amplifying a sound signal component (including a sound signal carrier and a sound intermediate frequency signal) and a chrominance signal component (including a color subcarrier and a carrier chrominance signal).

2. Description of the Prior Art

In the conventional color television receivers, a color television signal including a picture carrier, color subcarrier and sound carrier is converted by a tuner to an intermediate frequency which in turn is amplified in an intermediate frequency amplifier. Among these three signals thus amplified, the sound carrier is detected through a sound intermediate frequency signal detector so that a sound intermediate frequency signal is taken out. On the other hand, the picture carrier and the color subcarrier are detected through a common detector so that a luminance signal and carrier chrominance signal are produced which in turn are separated and amplified in a succeeding amplifier so as to be taken out.

The levels of the three signals described above tend to be changed due to various causes occurring before the signals arrive at the color television receiver or when they are being processed in the latter, and such level changes must be eliminated before said signals are finally supplied to a loudspeaker or a color picture tube. For such purposes, the various circuits mentioned hereafter are added to automatically control the gain of the picture signal and that of the sound signal, thereby preventing the signals from being undesirably changed. However, all of these circuits work effectively only in case the gain of the transmission route for each signal is sufficiently high. Conversely, if such gain is low, then they do not work effectively. In addition to the level control for the above three signals, it is also an important factor for the signal-processing system of a color television receiver to minimize the interference among the three signals. Especially, in a color television receiver, the sound carrier frequency (4.5 mc. on frequency spectrum) and the color subcarrier frequency (3.58 mc. on frequency spectrum) or the sound intermediate frequency signal and carrier chrominance signal may produce an undesired beat signal having a frequency of 920 kc. corresponding to the difference in frequency between the two signals because of the nonlinearity of the transmission system, and such beat signal tends to be mixed into the luminance signal to deteriorate the picture. In order to eliminate such a beat signal, it is the practice to provide a sound trap circuit for attenuating the sound intermediate frequency signal component, as will be described later. However, the provision of such a circuit disadvantageously results in a decreased gain of the sound signal so that it will become impossible to effectively maintain the sound signal level constant.

SUMMARY OF THE INVENTION

It is an object of this invention to provide a signal-processing circuit for use with a color television receiver, which is so designed as to secure a sufficient gain in the sound signal transmission route and to maintain the sound signal level constant.

Another object of this invention is to provide a signal-processing circuit for use with a color television receiver, wherein the level control for the sound signal component is effected simultaneously with that for the chrominance signal component.

Still another object of this invention is to provide an improved signal-processing circuit for use with a color television receiver, which is of simplified arrangement and economical.

The above objects can be accomplished in a circuit including an antenna for receiving a color television signal, a tuner for converting said color television signal to an intermediate frequency, means for amplifying and detecting the output of said tuner, means for commonly amplifying the sound signal component and chrominance signal component of the output of the tuner, and means for controlling the gain of said common amplifier means by detecting the carrier chrominance signal level.

Other objects, features and advantages of this invention will become apparent from the following description taken in conjunction with the accompanying drawings.

DESCRIPTION OF THE PREFERRED EMBODIMENTS

Figures 1, 2:
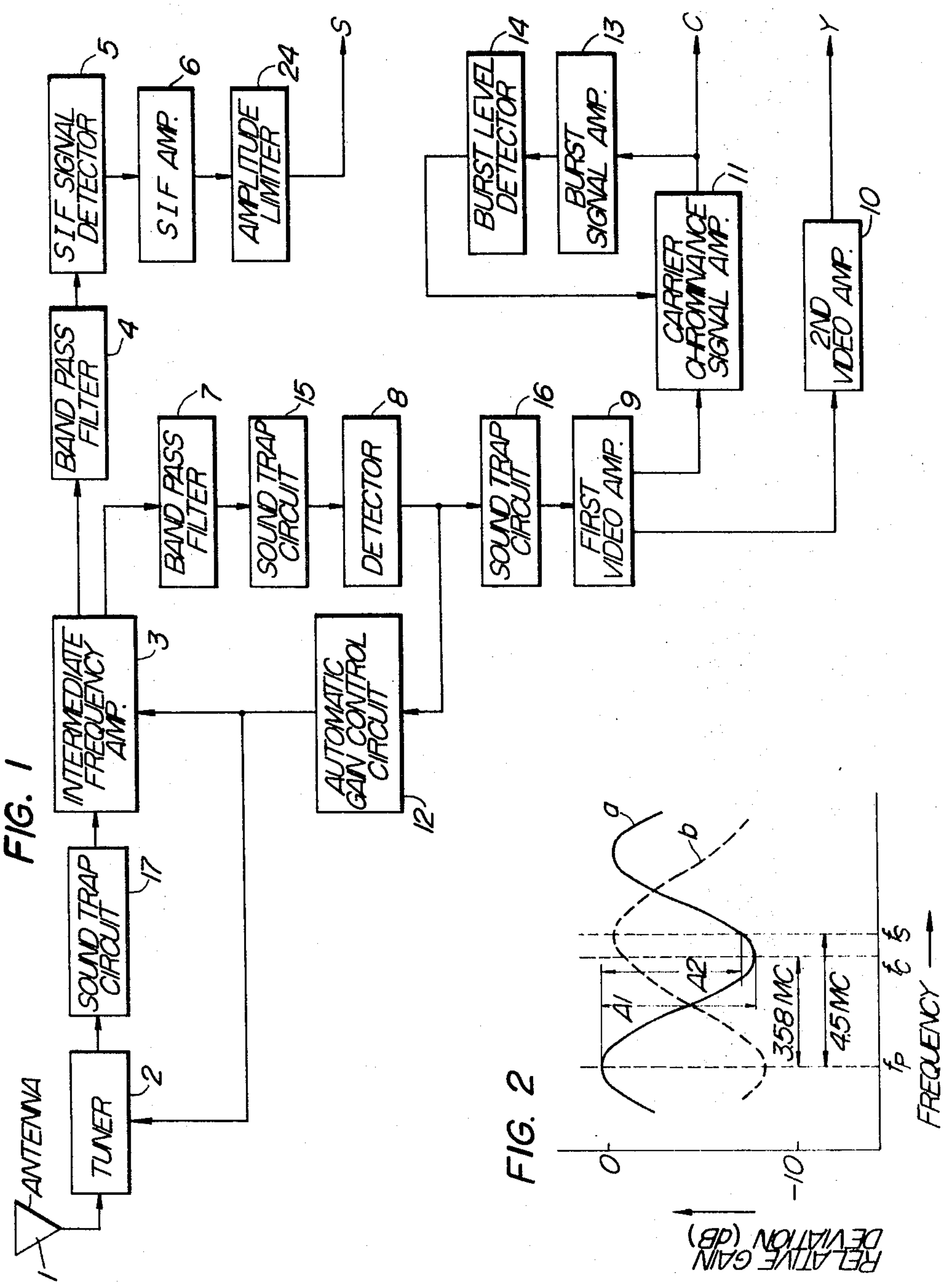
FIG. 1 is a block diagram showing a conventional color television receiver.
FIG. 2 is a view illustrating the deviation in the gain-frequency characteristics stemming from the impedance mismatch between the receiving antenna and the receiver input circuit.

Referring to FIG. 1, a color television signal arriving at an antenna 1 contains three signals such as (a) picture carrier frequency $f_p$, (b) color subcarrier frequency $f_c$ which is located at a position spaced apart from the picture carrier frequency $f_p$ by 3.58 mc. on the frequency spectrum, and (c) sound signal frequency $f_s$ which is located at a position spaced apart from the picture carrier frequency $f_p$ by 4.5 mc. on the frequency spectrum. The color television signal is converted by a tuner 2 to an intermediate frequency which in turn is amplified in an intermediate frequency amplifier 3. Among the three signals thus amplified, the sound carrier is detected by a sound intermediate frequency detector 5 (referred to as SIF detector hereinafter) through a band-pass filter 4 provided to pass therethrough the SIF signal, so that a 4.5 mc. SIF signal S is produced which in turn is supplied to a succeeding sound detector (not shown) through a SIF amplifier 6 and an amplifier limiter 24.

On the other hand, the picture carrier and the color subcarrier are detected through a band-pass filter 7 and a detector 8, with the result that there are produced a luminance signal Y of which the frequency band ranges from 0 to 3.5 mc. and a carrier chrominance signal C having a bandwidth of about ±500 kc. centering the color subcarrier frequency at 3.58 mc. Then, the luminance signal Y and the carrier chrominance signal C are commonly amplified in a first video amplifier 9, and thereafter the luminance signal Y is separated and amplified in a second video amplifier 10 while the carrier chrominance signal C is separated and amplified in a carrier chrominance signal amplifier 11. In this way, the luminance signal Y and carrier chrominance signal C are taken out.

In the foregoing, description has been made of the picture and sound recovering process in a color television receiver. There may also be provided the following circuits for making the level of each signal constant.

1. Automatic gain control circuit 12 (AGC circuit) for controlling the gain of the tuner 2 and that of the intermediate frequency amplifier 3.
2. Burst signal amplifier 13 and burst level detector 14 for controlling the gain of the carrier chrominance signal amplifier 11 to thereby make the carrier chrominance signal level constant.
3. Amplitude limiter 24 provided after the sound intermediate frequency amplifier 6 to thereby eliminate changes in the amplitude of the sound intermediate frequency signal S which have occurred in the preceeding stages.

The circuits described in the above items (1) and (3) are employed in any type of television receiver, and the circuits in item (2) have recently come to be used in relatively high-class color television receivers.

All the three signals described above are controlled by the aforementioned automatic gain control circuit 12. In case the intensity of an electric field to be picked up differs from area to area or from channel to channel, the AGC circuit works effectively because in that case the chrominance carrier and sound carrier levels vary in proportion to the picture carrier level, while the circuit can no more produce the effect of making the color subcarrier and sound carrier levels constant in case the color subcarrier and sound carrier levels vary not in proportion to the picture carrier level but irregularly with respect to the latter. Such irregular variations of the color subcarrier and sound carrier with respect to the picture carrier stem from a deviation in frequency characteristic due to the impedance mismatch between the receiving antenna and the receiver input circuit. FIG. 2 shows such a deviation in frequency characteristic. The relative gain deviations in terms of frequency stemming from the impedance mismatch change as shown by the curves *a* and *b* in FIG. 2. That is, in the case of curve *a*, the relative gain at the color subcarrier frequency $f_c$ and that at the sound carrier frequency $f_s$ are decreased from that at the picture carrier frequency $f_p$ by $A_1$ and $A_2$ respectively, while in the case of curve *b*, the situation is reversed, that is, these gains are increased by the same amounts as the above. The greater the mismatch, the more remarkable become such deviations. Therefore in order that the carrier chrominance signal level can be made constant even in those cases, a frequency burst signal (reference carrier chrominance signal of a frequency 3.58 mc. with a constant amplitude level inserted within the horizontal retracing interval at the broadcasting station) is taken from the output side of the carrier chrominance signal amplifier 11, and is then amplified in the burst signal amplifier 13. The amplitude level of the color burst signal is detected by burst level detector 14 so as to be taken out as a direct current signal by which the gain of the carrier chrominance signal amplifier 11 is controlled so that the level of the carrier chrominance signal C is kept constant.

Signal levels can be kept constant with the aid of the aforementioned various circuits, but those circuits work effectively only in case the transmission route for each signal has a sufficiently high gain. Conversely, such circuits have such a serious drawback that they do not work effectively when the gain is low.

In order to eliminate undesired beat signals of 920 kc., sound trap circuits are incorporated in the signal-processing system of the color television receiver. That is, sound trap circuits 15 and 16 are provided at the input and output sides of the detector 8 respectively, so that the sound carrier is attenuated by the sound trap circuit 15 and the SIF signal S is attenuated by the sound trap circuit 16. Thus, beat frequency components stemming from nonlinear distortions in the detector 8 and the first amplifier 9 can be suppressed. Since there is a possibility that 920 Kc. beat interference may also occur in the intermediate frequency amplifier 3 due to the cross modulation which results from the nonlinear distortion thereof, an additional sound trap circuit 17 is provided at the input side of the intermediate frequency amplifier 3, thereby lowering the level of a sound signal component supplied to the intermediate frequency amplifier 3. If use is made of transistors for the intermediate frequency amplifier 3, then it is essential to provide the sound trap circuit 17 because generally a transistor produces a greater nonlinear distortion than an electron tube. However, the provision of the sound trap circuit 17 as described above results in a decreased sound carrier gain in the signal transmission route. As a result, the signal level cannot be effectively made constant by means of the amplitude limiter 24.

The basic principle of the present invention is such that the 4.5 mc. SIF signal S is supplied to the carrier chrominance signal amplifier together with the 3.58 mc. carrier chrominance signal C so that these two signals are commonly amplified. Thus, it is possible to sufficiently increase the gain of the SIF signal S. Further, the relative gain deviation between the chrominance carrier and the sound carrier which stems from the impedance mismatch between the antenna and the receiver input circuit is slight because the frequency positions of these carriers on the frequency spectrum are fairly close to each other. Thus, it is possible to simultaneously make constant the levels of the carrier chrominance signal C and sound intermediate frequency signal S by automatically controlling the gain of the carrier chrominance signal amplifier.

Figure 3:
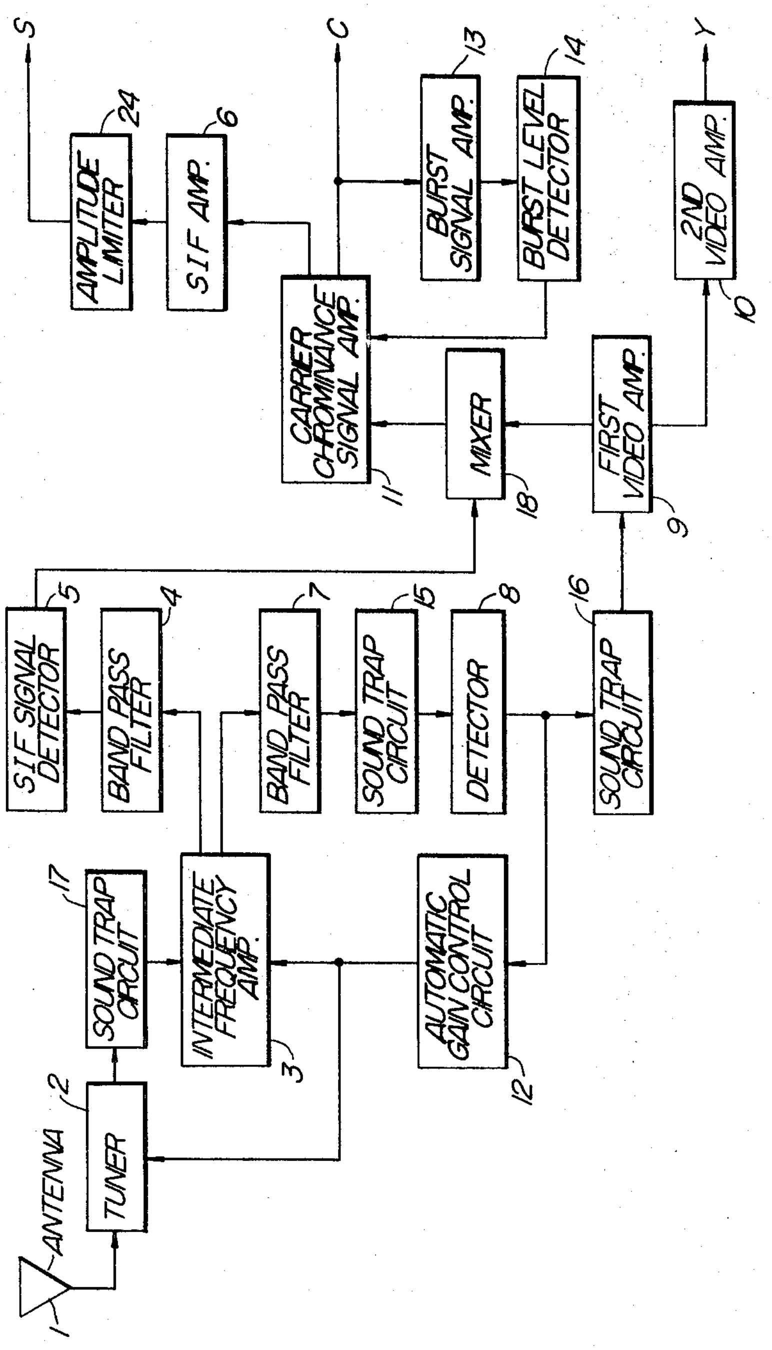
FIGS. 3 to 5 are block diagrams showing embodiments of the present invention.

FIG. 3 is a block diagram showing an embodiment of this invention, wherein parts corresponding to those of FIG. 1 are indicated by like reference numerals. The reference numeral 18 denotes a mixer. Referring to FIG. 3, the SIF signal S detected by the SIF detector 5 is mixed in the mixer 18 with the carrier chrominance signal C from the first video amplifier 9 and then supplied to the carrier chrominance signal amplifier 11. The SIF signal S is more strongly amplified by the amplifier 11 than with the conventional system, so that the gain is remarkably increased to enable the succeeding amplitude limiter 24 to work effectively. Further, the amplitude level of the color burst signal is detected in the amplifier 11 as described earlier, and the gain of the amplifier 11 can be controlled by this signal. Consequently, the level of the carrier chrominance signal C is controlled, and the level of the sound intermediate frequency signal S mixed therewith is also controlled at the same time.

In this way, the gain of the SIF signal can be sufficiently increased, and the signal level can be made constant, so that it is possible to reduce the burden imposed on the amplitude limiter 24 provided after the SIF amplifier 6 and thereby increase the amplitude-limiting effect. Consequently, a sound signal with a constant level can always be obtained.

Figure 4:
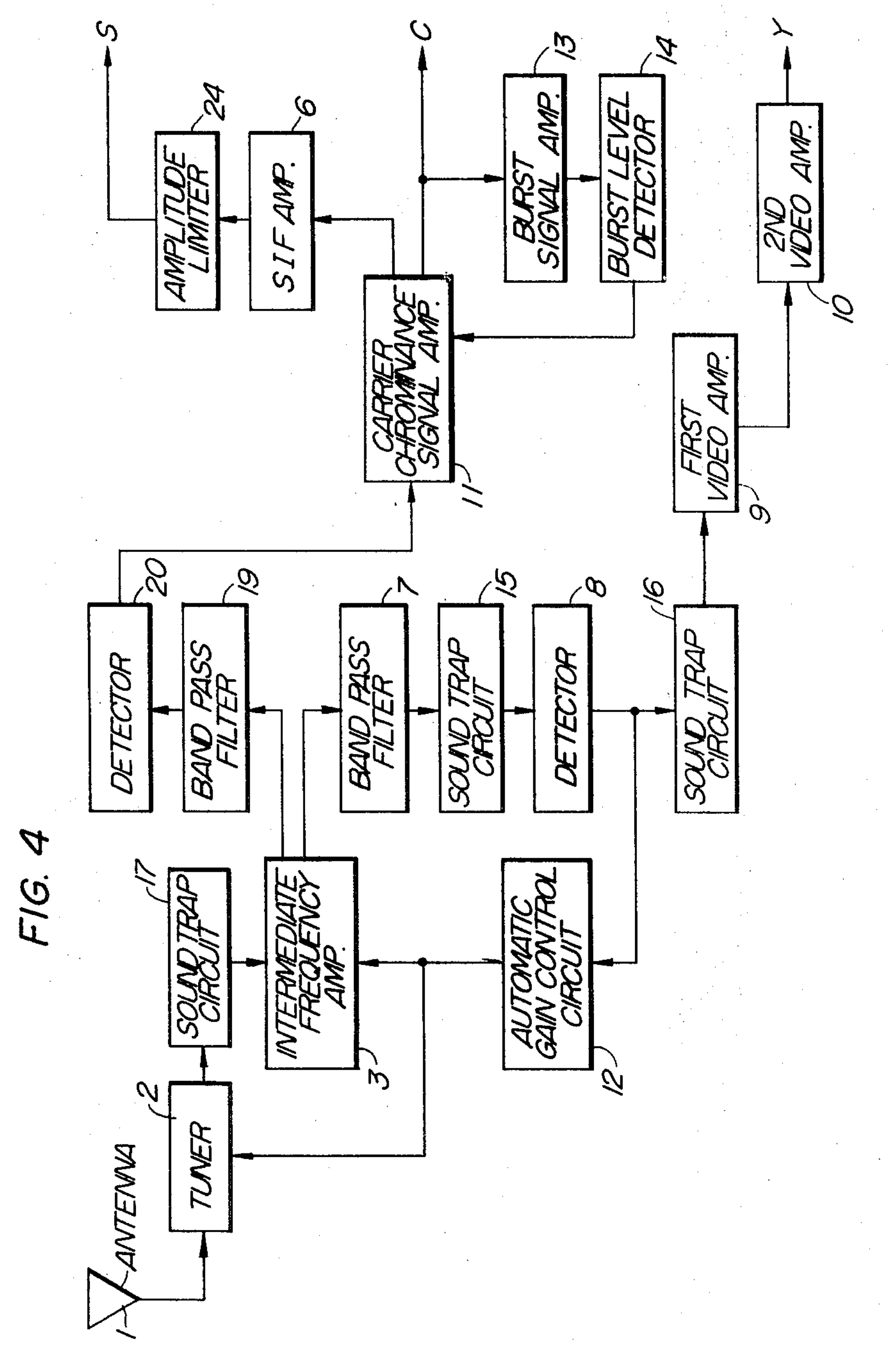

FIG. 4 is a block diagram showing a second embodiment of the present invention, wherein the reference numeral 19 represents a band-pass filter provided to pass therethrough the SIF signal and carrier chrominance signal, and the reference numeral 20 denotes a detector for detecting the SIF signal and carrier chrominance signal. Parts of FIG. 4 corresponding to those of FIG. 1 are indicated by like reference numerals. A color television signal arriving at the antenna 1 is converted to the intermediate frequency by the tuner 2 and then amplified in the intermediate frequency amplifier, 3.

The sound carrier and the color subcarrier of the color television signal thus frequency converted and amplified are detected through the band-pass filter 19 and detector 20 and then amplified by the carrier chrominance signal amplifier 11. The gain control for the amplifier 11 is performed in the same manner as described above in connection with FIG. 3, so that the sound intermediate frequency signal S and carrier chrominance signal C of which the levels are stabilized are obtained. On the other hand, the picture carrier is detected through the band-pass filter 7 and detector 8, so that there is produced luminance signal Y of which the frequency band ranges from 0 to 3.5 mc. The remaining arrangement and operation are the same as with the conventional system, and therefore further description thereof will be omitted.

In the FIG. 4 embodiment, the sound intermediate frequency signal S and carrier chrominance signal C follow the same path until they arrive at the carrier chrominance signal amplifier 11, and therefore a mixer such as indicated at 18 in FIG. 3 is not needed so that the circuit arrangement can be simplified accordingly.

Figure 5:
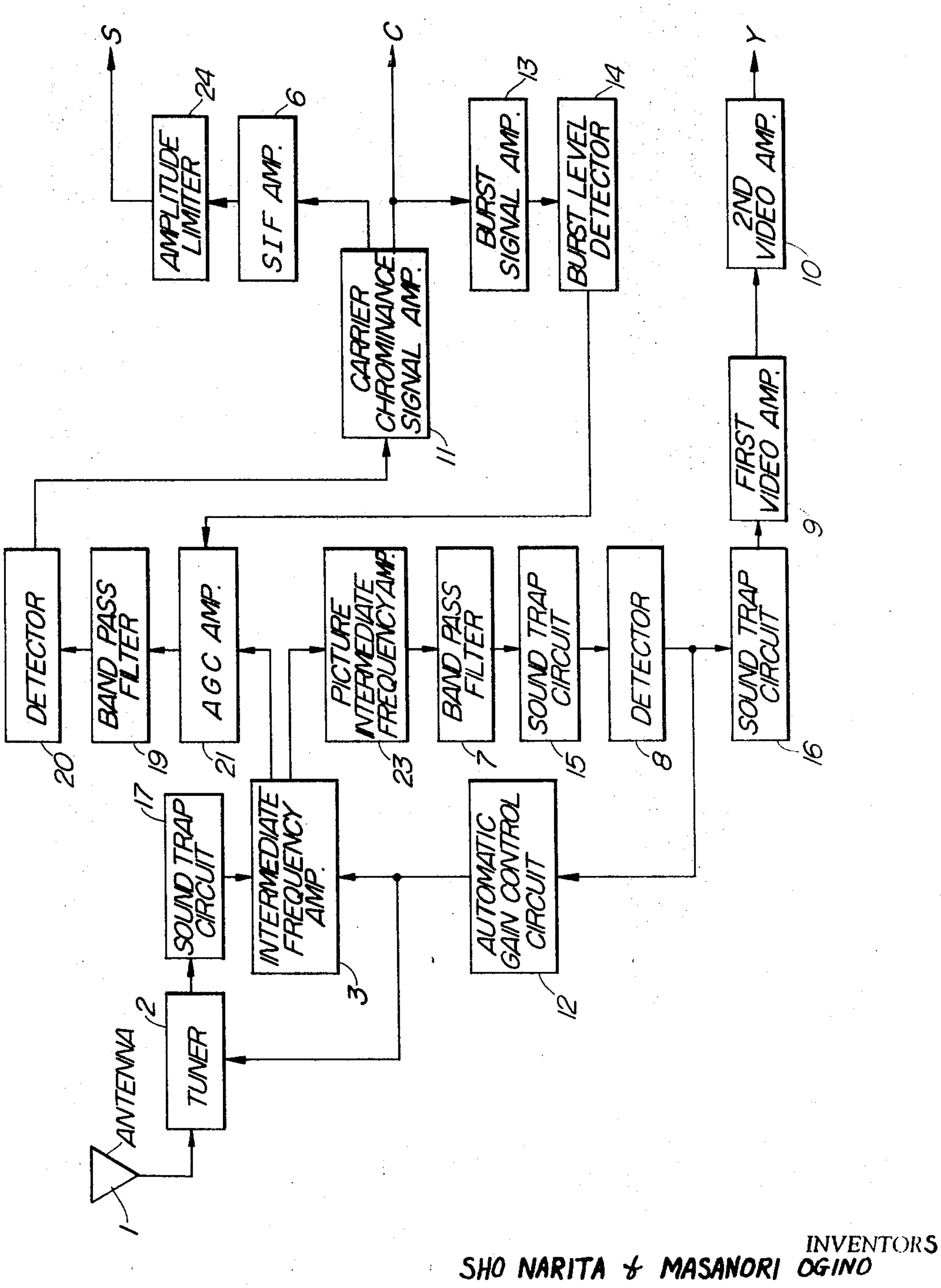

FIG. 5 is a block diagram showing a third embodiment of the present invention, wherein the reference numeral 21 represents an automatic gain control amplifier for the sound carrier and chrominance carrier, and 23 a picture intermediate frequency amplifier. Parts of FIG. 5 corresponding to those of FIG. 4 are indicated by similar reference numerals. In the respective embodiments, the gains of the SIF signal and carrier chrominance signal which have already been detected are controlled in the amplifier 11, while in the present embodiment, the output of the intermediate frequency amplifier 3 is applied directly to the automatic gain control amplifier 21, thereby commonly amplifying and gain controlling the sound carrier and color subcarrier. In this case, too, a signal produced by detecting the level of the color burst signal is likewise used as control signal.

The output of the automatic gain control amplifier 21 is supplied to the detector 20 through the band-pass filter 19 so that a sound intermediate frequency signal and carrier chrominance signal are produced which in turn are commonly amplified in the amplifier 11 and thereafter separated from each other. It is also possible that the sound intermediate frequency signal S may be applied directly to the sound intermediate frequency amplifier 6 without being passed through the amplifier 11. On the other hand, after the picture carrier has been passed through the picture intermediate frequency amplifier 23, luminance signal Y is taken out through the same route as that in each of the previous embodiments.

As described above, the circuit according to this invention increases the gain of the sound signal component and automatically controls the gain so that an excellent sound with a constant level can always be reproduced. Furthermore, the gain control for the sound signal component can be performed commonly with that for the chrominance signal component so that the arrangement can be simplified to be economical.

The foregoing embodiments have been given only by way of example and not by way of limitation, and various modifications will readily occur to those skilled in the art without departing from the spirit and scope of this invention.

We claim:

1. A signal-processing circuit for use with a color television receiver, comprising:

1. means for converting a high frequency color television signal to an intermediate frequency signal containing a luminance signal component, chrominance signal component and sound signal component;
2. means connected with said converting means for amplifying and detecting the luminance signal component and chrominance signal component of said intermediate frequency signal;
3. means for taking out the luminance signal connected with said means for amplifying and detecting the luminance signal component and chrominance signal component; and
4. a cascaded circuit connected with said converting means and to which is applied said intermediate frequency signal, said cascaded circuit including at least (a) means for detecting said sound signal component, (b) means for summing the detected sound signal component and the detected chrominance signal component and (c) an amplifier for amplifying the output of said summing means; and further including
5. means for detecting the color burst level of the carrier chrominance signal and means for automatically controlling the gain of the amplifier for amplifying the output of said summing means in accordance with the color burst level of the carrier chrominance signal.